United States Patent Office 3,137,308
Patented June 16, 1964

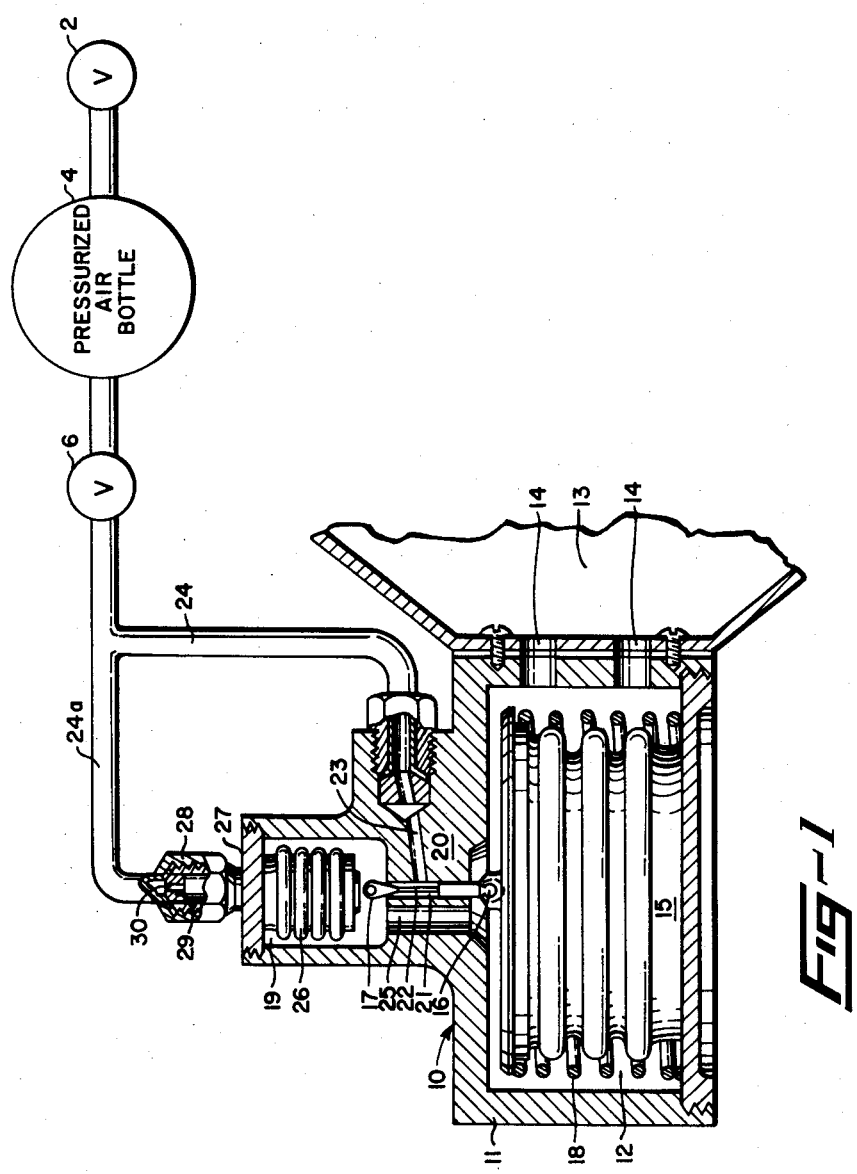

3,137,308
COMPARTMENT PRESSURE REGULATING DEVICE
Sigmund H. Machlanski, Yucaipa, and Theodore R. Wallace, Pomona, Calif., assignors to Aerojet-General Corporation, Azusa, Calif., a corporation of Ohio
Filed Aug. 18, 1960, Ser. No. 50,359
9 Claims. (Cl. 137—63)

This invention relates to pressure regulating and flow limiting controls for compartments in which it is required to keep the pressure of air or other gas therein at a substantially constant value, notwithstanding slight leakage from the compartment.

The invention particularly relates to control means for maintaining a required pressure within narrow limits in compartments of vehicles such as missiles and space craft in which the required pressure has to be maintained during the flight of the vehicle, which is generally of limited duration. The invention will be hereinafter described as applied to the maintenance of a required pressure within narrow limits in a missile compartment, but only by way of illustration and not by way of limitation.

A number of specific requirements have to be taken into consideration in providing apparatus of the kind described for the purposes indicated, such as: lightness in weight, accurate functioning throughout a required duration of flight; and provision for continued operation in the event of malfunction of some component of the apparatus, to ensure against destructive effects on the structure of the compartment.

It is an object of the invention to provide a pressure regulating device in which the moving parts are sufficiently light in weight so that under "zero gravity" conditions the effective operation of the device is maintained.

Another object of the invention is to provide a pressure regulating device of compact arrangement in which pressure lines connecting the components of the device are reduced to a minimum.

Still another object of the invention is to provide a pressure regulating device of the kind described in which the principal elements of the mechanism are contained in a housing adapted to be mounted directly on the pressurized compartment.

A further object of the invention is to provide pressure regulating mechanism for a pressurized compartment which mechanism comprises only mechanical components, thus being free of danger from the failure of electrically operated parts.

Another important object of the invention is to provide pressure control mechanism for a pressurized compartment so arranged that malfunction of any one of the operating elements of the control cannot result in destructive conditions being set up in the pressurized compartment.

With the above described objects in view, and further objects and features of the invention which will appear from the following description and accompanying illustrative drawing, the invention resides in control means for maintaining gas pressure within a pressurized compartment within predetermined limits and comprises a source of gas under pressure greater than that to be maintained in said compartment, a member responsive to variations of pressure in said compartment, valve means operated by said pressure responsive member and controlling flow of gas from said source of gas under pressure into said compartment, means limiting the opening of said valve means and positioned in accordance with the pressure of gas from said source of gas under pressure, and means effective in case of malfunction of elements of said control means to prevent destructive effects on said compartment.

By way of illustrative example, the flow control means of the invention will be described as applied to a pressurized compartment to maintain the pressure therein within the limits of 9.5 pounds per square inch absolute, hereinafter referred to as p.s.i.a., and 10 p.s.i.a. for a sufficient length of time for a missile flight of predetermined duration, the minimum expected leakage from the compartment being 10 lbs. of air per hour. A spring is used to balance the nominal pressure and difference in pressure of ½ lb. in the compartment pressure and is sufficient to bring the control means into operation.

A pressure range of 100 p.s.i.a. in an air supply bottle is assumed. By design the compartment will withstand an inflow of air at the rate of 35 lbs. per hour for a limited time.

In the drawings, the single figure shows the novel control means incorporated in the invention in section, other components of known types assembled with the control means being diagrammatically indicated on a smaller scale.

The numeral 10 indicates generally the pressure regulating and flow limiting means of the invention mounted directly on the wall of the pressurized compartment and connected by a pressure pipeline through a positive seal valve to a pressurized air bottle provided with a hi-pressure and quick disconnect fill valve. It is to be understood that the positive seal valve 2, air bottle 4, which is a high stress vessel, and hi-pressure fill valve 6 are components of known construction and commercially available. The combination shown sets up a system to illustrate the functioning of the novel combined pressure regulator and flow limiter of this invention.

A suitable positive-seal, squib-operated valve 2, is marketed by several manufacturers. The valves incorporate a metal diaphragm sealing the inlet from the outlet and a squib, which is an explosive device ignited by an electric current when a contact in an electric circuit is closed, is effective to destroy the diaphragm and thereby permit flow through the valve putting the system into operation. The positive seal valve is the only electrically operated component in the system assembly, and functions as a starting valve only. Such a valve is described in application, Serial Number 604,436, filed August 16, 1956, and issued as Patent No. 2,966,163 on December 27, 1960, by Nels E. Nylin, and which is assigned to the assignee of the present application.

The pressurized air bottle 4 is also a commercially available component, the characteristics of which will be selected according to the requirements to be met. In the illustrative example given hereafter, a plastic glass-fabric sphere manufactured by the Aerojet-General Corporation of Azusa is used. This bottle has a nominal working pressure of 3500 lbs. p.s.i.g. and an operating range of from −65° F. to 160° F. It will be obvious that any other reservoir of pressure air or gas may be used to meet other requirements than those in the illustrative embodiment described hereinafter.

The hi-pressure fill valve 6 is of the quick-disconnect type and may be used to enable the pressure in the pressurized air bottle to be checked.

The pressure limiting and flow limiting means 10 comprise a housing 11 enclosing a chamber 12 placed in communication with the interior of the pressurized compartment 13 by passages 14. Enclosed chamber 12 is therefore under the same internal gas or air pressure as that in the compartment 13.

Positioned in chamber 12 is an aneroid 15, which is a sealed bellows capsule evacuated to zero p.s.i.a. in order to provide for absolute pressure control, and varying in height under variation in pressure in chamber 12. One end wall of the aneroid is fastened to housing 11. The other end wall or plate of the aneroid 15 is provided with a push-pull part spherical socket member 16 which receives and operates the stem 22 of a poppet type valve 17. As shown in the drawing, the valve 17 is preferably arranged axially above the aneroid 15. A coil spring 18 is arranged around the aneroid 15 under compression between the top plate thereof connected to the valve 17 and the wall of the housing to which the aneroid is fastened. The function of spring 18 is to balance the nominal pressure force of 10 p.s.i.a., thus enabling the aneroid to operate the valve in response to small variations of pressure in chamber 12, in practice on the order of ½ lb. per sq. in.

The housing 11 also encloses a chamber 19 coaxial with the stem of the poppet valve 17 and separated from chamber 12 by a connection section 20 of the housing 11. A passage 21 is drilled through section 20 for the stem 22 of valve 17. Stem 22 is of a diameter, at the portion connected to aneroid 15, to enjoy a free sliding fit in passage 21, but is reduced in diameter between that portion and the head of the valve 17 to provide a passage for pressure air which is introduced therein through a lateral passage 23 to which a pressure air pipe 24 is connected.

A further passage 25 is provided connecting chambers 12 and 19 through the connection portion 20 of the housing.

The flow rate of air from the pressurized air bottle into the control means 10 is limited under normal conditions to a predetermined maximum by the provision of a device effective to limit the lift of poppet valve 17. The flow limiting device comprises an inlet pressure positioned bellows 26 mounted in chamber 19 with its lower pressure responsive end spaced from the head of the poppet valve 17 in closed position as by designed extension of the stiff bellows. The bellows may be further stiffened by the action of a spring (not shown), to afford the limited length of stroke of the valve 17 required to pass air at any inlet pressure between 3500 and 100 lbs. p.s.i.a. at the rate of 35 lbs. of air per hour. The base of bellows 26 is mounted on a plate 27 which closes chamber 19. A connection 28 is mounted on plate 27 to which a branch pipe 24a from pipe 24 is connected. The pressure of the air in the air bottle is therefore established in bellows 26. The length of stroke permitted to valve 17 therefore increases as bellows 26 contracts in accordance with the pressure decrease within the bellows, the increase in stroke of valve 17 corresponding to the increased flow required at the decreased pressure.

In order to provide a fail-safe feature preventing an excessive flow of pressurized air through bellows 26 in case of the rupture or leakage thereof, a plug 29 drilled with a fine hole 30 is positioned in connection 28, the size of the hole permitting a maximum flow of 10 lbs. of air per hour at the maximum bottle pressure of 3500 lbs. p.s.i.a. In the event of such failure of bellows 26 the action of the bellows as a variable stop for valve 17 would cease but pressure in compartment 13 would still be held within the required range by operation of valve 17 and by bellows 15 and spring 18.

Possible failure of the compartment pressure sensing aneroid 15 would result in spring 18 opening valve 17 to the amount permitted by the position of the lower end of bellows 26, which position is dependent on the pressure in the air bottle 4. As the air bottle pressure is not now throttled, since valve 17 cannot close, flow past valve 17 would rapidly reach maximum flow of 35 lbs. of air per hour for the remainder of the flight. The compartment is designed to withstand such excess flow for a limited time.

Operation

In the illustrative example given, a compartment of a missile is required to be maintained under an internal nominal air pressure of 10 pounds per square inch absolute within a narrow range designed to be one half pound, notwithstanding an estimated minimum leakage of 10 lbs. of air per hour from the compartment. A storage vessel of air under a pressure of 3500 lbs. per square inch and internal volume of 1090 cubic inches is calculated to be adequate to supply the make up air required before the pressure falls to 100 lbs. per square inch in the pressure vessel for the estimated duration of flight. It is to be understood that the control means of the invention would not be brought into operation by a signal detonating the squib opening the positive seal valve until the missile was travelling through regions of reduced atmospheric pressure. Valve 17 remains closed so long as the compartment pressure is above 10 lbs. p.s.i.a. The volume of pressurized air which is carried is designed to ensure proper pressurizing of the compartment for the estimated duration of the flight of the missile even should leakage from the compartment rise from the estimated 10 lbs. of air to three times that amount, by an increased rate of cycling of the control. Each cycle consists of a lift of valve 17 by extension of aneroid 12 when pressure in the compartment falls to about 9½ lbs. p.s.i.a., to a closing of the valve due to compression of the aneroid when pressure in the compartment again rises to 10 lbs. p.s.i.a.

The integration of pressure regulation and flow limiting functions in one device, instead of handling the functions by separate mechanisms, results in important reductions in weight and size. The use of the inlet pressure responsive flow limiting valve stop in conjunction with the pressure regulator prevents extreme variations of pressure cycling as the inlet pressures decrease.

A preferred embodiment of the invention has been specifically described and shown in the drawing by way of illustration but not by way of limitation since changes may be made in the described embodiment by those skilled in the art without departing from the scope of the invention as defined by the appended claims.

What we claim is:

1. An apparatus of the class described comprising in combination a non-hermetic compartment, a limited source of pressurized gas, means connecting said source of pressurized gas with said compartment including a housing having a chamber therein adapted to communicate with the interior of said compartment through a fluid passage, a pressure responsive device mounted in said chamber for responding to the pressure in said compartment, said limited source of pressurized gas sufficient to supply the required gas pressure to the compartment; valve means in said connecting means, said valve means being connected to said pressure responsive device and opened and closed by said pressure responsive device to admit gas from said source to the compartment when the pressure therein falls below a predetermined lower limit and to close said valve means when said pressure in the compartment reaches a predetermined higher limit; and pressure responsive means in said housing including a member associated with said housing and positioned in the line of movement of said valve means, said member of said pressure responsive means being positioned by the pressure of gas in said source to automatically limit the opening movement of said valve means to a degree decreasing with decrease in the pressure of the gas from said source whereby the gas pressure in said non-hermetic compartment is maintained within narrow limits using said limited source of pressurized gas.

2. An apparatus of the class described comprising in combination a non-hermetic compartment, a limited source of pressurized gas, means connecting said limited source of pressurized gas with said compartment including a housing having a chamber therein adapted to communicate with the interior of said compartment through a fluid passage; an aneroid mounted in said chamber for responding to the pressure in said compartment, said limited source of pressurized gas sufficient to supply the required gas pressure to the compartment for a limited period of time, said connecting means including an inlet passage in said housing; a poppet valve controlling said inlet passage, the stem of said poppet valve being connected to and operated by said aneroid; and pressure responsive means in said housing including a member associated with said housing and positioned in the line of movement of said valve, said member of said pressure responsive means being positioned by the pressure of gas in said source to automatically limit the opening movement of said valve to a degree decreasing with decrease in the pressure of gas from said source whereby gas pressure in said compartment is maintained within narrow limits using said limited source of pressurized gas.

3. The apparatus as set forth in claim 2 and, in addition, comprising resilient means acting on said aneroid to counterbalance the nominal pressure to be maintained in said compartment.

4. The apparatus as set forth in claim 3 wherein pressure responsive means also includes bellows means for positioning said member; and a conduit associated with said connecting means connecting said bellows means with said source of gas at a pressure higher than that to be maintained in the compartment.

5. The apparatus as set forth in claim 2 wherein said pressure responsive means also includes bellows means for positioning said member and a conduit connecting said bellows means with said source of pressurized gas.

6. The apparatus as set forth in claim 5 and, in addition: a drilled plug in the conduit connecting said bellows means with the source of pressurized gas, the hole drilled in said plug constituting a restricting orifice limiting the flow therethrough to that required to maintain the nominal pressure in said compartment.

7. The apparatus as set forth in claim 2 and, in addition, a coil spring arranged around said aneroid, which aneroid has been evacuated, said coil spring acting on said aneroid to counterbalance the nominal pressure in said compartment until the pressure in said compartment falls below the nominal pressure due to leakage from the compartment whereby the coil spring causes the poppet valve to open.

8. An apparatus of the class described comprising in combination a non-hermetic compartment, a limited source of pressurized gas, means connecting said limited source of pressurized gas to said compartment and including a housing, said housing containing first and second axially aligned chambers communicating with said compartment and separated by a connection part of the housing; an evacuated aneroid arranged axially in said chamber with one end fixed to an end wall of the first chamber for responding to the pressure in said compartment; a coil spring surrounding said aneroid and under compression between the fixed end of the aneroid and the free end thereof, the strength of the spring being effective to move the aneroid to an extended position when the pressure in said compartment falls below a predetermined lower limit; a passage associated with said connecting means through the connection part of the housing; a valve controlling said passage said valve being connected to said aneroid and operated by movement of said aneroid in response to variations of pressure in said first chamber; a conduit associated with said connecting means from said source of air under pressure greater than that to be maintained in said compartment connected to said valve controlled passage; a bellows arranged in the second of said chambers; a conduit leading air from said pressure source connected to the interior of said bellows, the bellows being arranged relative to said valve so as to automatically limit the amount of opening of said valve inversely as the pressure of the air acting therein decreases; a plug traversed by an orifice positioned in the path of high pressure air into said bellows, said orifice being effective to limit the maximum rate of flow of air therethrough to not more than the rate of leakage of air from said compartment; and a second passage through the connection part of the housing and placing said chambers in communication with one another whereby the pressure in said non-hermetic compartment is maintained within narrow limits for a predetermined period of time from a limited source of pressurized gas.

9. An apparatus of the class described comprising in combination a non-hermetic compartment, a limited source of pressurized gas associated with said compartment, means interconnecting said gas source with said compartment, a pressure responsive device located in said interconnecting means, valve means in said interconnecting means, said valve means being connected to said pressure responsive device and actuated by said pressure responsive device for controlling gas flow from said gas source into said compartment, a regulating device located in spaced relationship with and in the line of movement of said valve means and interconnected with said gas source whereby the resistance to opening movement of said valve means is progressively decreased as the gas pressure to said regulating device decreases, and means located between said gas source and said regulating device for preventing destructive effects on said compartment in case of malfunction of elements of said valve means.

References Cited in the file of this patent
UNITED STATES PATENTS

| | | |
|---|---|---|
| 2,434,420 | Lichtenstein | Jan. 13, 1948 |
| 2,833,303 | Leutwiler | May 6, 1958 |
| 2,918,930 | Jansen | Dec. 29, 1959 |